United States Patent
Gupta et al.

(10) Patent No.: US 8,565,790 B2
(45) Date of Patent: Oct. 22, 2013

(54) METHODS AND APPARATUSES FOR DETERMINING IF ACCESS TO A REGION IS FEASIBLE OR INFEASIBLE FOR A USER OF A MOBILE DEVICE

(75) Inventors: Rajarshi Gupta, Santa Clara, CA (US); Saumitra Mohan Das, San Jose, CA (US); Behrooz Khorashadi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 13/009,658

(22) Filed: Jan. 19, 2011

(65) Prior Publication Data

US 2012/0021771 A1   Jan. 26, 2012

Related U.S. Application Data

(60) Provisional application No. 61/297,577, filed on Jan. 22, 2010.

(51) Int. Cl.
*H04B 7/00* (2006.01)
*H04W 24/00* (2009.01)

(52) U.S. Cl.
USPC .... 455/456.3; 455/41.2; 455/423; 455/456.1; 455/525

(58) Field of Classification Search
USPC ............ 455/41.2, 66.1, 67.11, 403, 418–420, 455/422.1, 423–425, 426.2, 432.1, 432.3, 455/433–434, 435.1–435.3, 445–446, 450, 455/456.1–456.6, 500, 507–509, 513–514, 455/517, 524–525, 550.1, 554.2, 555, 455/557–558, 561
See application file for complete search history.

(56) References Cited

U.S. PATENT DOCUMENTS 5,867,478 A  *  2/1999  Baum et al. ............... 370/203
5,944,132 A      8/1999  Davies et al.
(Continued)

FOREIGN PATENT DOCUMENTS

| EP | 1263252 A2 | 12/2002 |
|---|---|---|
| WO | 2008142605 A1 | 11/2008 |
| WO | 2009011838 A2 | 1/2009 |
| WO | 2009021068 | 2/2009 |

OTHER PUBLICATIONS

Hazas et al.,"Location-and Context-Awareness", Second International Workshop, LoCA 2006, Dublin, Ireland, May 2006 Proceedings. LNCS 3987, pp. 64-73.

(Continued)

*Primary Examiner* — Meless Zewdu
(74) *Attorney, Agent, or Firm* — Arnold J. Gum

(57) ABSTRACT

Techniques are provided which may be implemented using various methods and/or apparatuses in a mobile device to allow the mobile device to obtain map information associated with at least a portion of an indoor environment comprising a plurality of regions. The mobile device may also obtain additional measurement information associated with at least the portion of the indoor environment, wherein the additional measurement information is based, at least in part, on previously obtained estimated position measurement information associated with a plurality of mobile devices within the indoor environment. The mobile device may determine whether access to at least one of the plurality of regions is either feasible or infeasible to a user associated with the mobile device. The determination may be based, at least in part, on the map information and the additional measurement information.

81 Claims, 3 Drawing Sheets

(56) References Cited

U.S. PATENT DOCUMENTS

| | | | |
|---|---|---|---|
| 7,120,135 B2 * | 10/2006 | Kim | 370/329 |
| 7,224,741 B1 * | 5/2007 | Hadad | 375/260 |
| 7,640,026 B2 * | 12/2009 | Cameron | 455/456.1 |
| 7,881,720 B2 * | 2/2011 | Huang et al. | 455/446 |
| 7,933,605 B2 | 4/2011 | Rappaport et al. | 455/446 |
| 8,040,219 B2 * | 10/2011 | Haartsen et al. | 340/8.1 |
| 2002/0072881 A1 | 6/2002 | Saitta | |
| 2004/0259555 A1 * | 12/2004 | Rappaport et al. | 455/446 |
| 2005/0043933 A1 * | 2/2005 | Rappaport et al. | 703/1 |
| 2006/0119516 A1 | 6/2006 | Krumm et al. | |
| 2006/0258368 A1 | 11/2006 | Granito et al. | |
| 2007/0187554 A1 | 8/2007 | Bitar et al. | |
| 2007/0285283 A1 | 12/2007 | Bitar et al. | |
| 2009/0213009 A1 * | 8/2009 | Ishiwatari et al. | 342/450 |
| 2010/0023249 A1 | 1/2010 | Mays et al. | |
| 2010/0125409 A1 * | 5/2010 | Prehofer | 701/207 |
| 2010/0322077 A1 * | 12/2010 | Cho et al. | 370/241 |

OTHER PUBLICATIONS

International Search Report and Written Opinion—PCT/US2011/021934, ISA/EPO—Jun. 28, 2011.

* cited by examiner

US 8,565,790 B2

METHODS AND APPARATUSES FOR DETERMINING IF ACCESS TO A REGION IS FEASIBLE OR INFEASIBLE FOR A USER OF A MOBILE DEVICE

This application claims priority under 35 USC 119 to U.S. Provisional Application Ser. No. 61/297,577, filed Jan. 22, 2010, and entitled "Deriving Infeasibility Regions In A Map," which is assigned to the assignee hereof and which is incorporated herein by reference.

BACKGROUND

The subject matter disclosed herein relates to electronic devices, and more particularly to methods and apparatuses for use in or with a mobile device having position estimation and/or navigation capabilities.

Mobile devices may provide a user with positioning and/or navigation information. For example, certain mobile devices may be enabled to provide driving directions from one location to another based on estimated position measurements derived from signals transmitted by location beacons, such as, e.g., satellites or possibly terrestrial transmitters of one or more global and/or local navigation systems. In some instances, location based services may be provided to a mobile device through a wireless and/or cellular telephone/data network to further allow for positioning and/navigation, for example, in an indoor environment.

These techniques tend to rely on various forms of map information to assist in directing a user from one location to another. In certain instances it may be that the available map information may be out of date, incorrect, sparse, and/or otherwise lacking in some manner and as such resulting positioning and/or navigation capabilities may be less useful and/or possibly faulty.

Hence, there is a need for techniques which may provide for or otherwise support a more reliable, accurate, useful, and/or otherwise more robust positioning and/or navigation capability in a mobile device.

SUMMARY

Some example techniques are presented herein which may be implemented in various method and apparatuses in a mobile device to possibly provide for or otherwise support a more reliable, accurate, useful, and/or otherwise more robust positioning and/or navigation capability in a mobile device.

In accordance with an example implementation, a method may be provided which comprises, with a mobile device: obtaining one or more electrical signals representing map information associated with at least a portion of an indoor environment comprising a plurality of regions; obtaining one or more electrical signals representing additional measurement information associated with at least the portion of the indoor environment, the additional measurement information being established based, at least in part, on previously obtained estimated position measurement information associated with a plurality of mobile devices within the indoor environment; and determining whether access to at least one of the plurality of regions is either feasible or infeasible to a user associated with the mobile device based, at least in part, on the map information and the additional measurement information.

In accordance with another example implementation, an apparatus may be provided for use in a mobile device. The apparatus may comprise: means for obtaining map information associated with at least a portion of an indoor environment comprising a plurality of regions; means for obtaining additional measurement information associated with at least the portion of the indoor environment, the additional measurement information being established based, at least in part, on previously obtained estimated position measurement information associated with a plurality of mobile devices within the indoor environment; and means for determining whether access to at least one of the plurality of regions is either feasible or infeasible to a user associated with the mobile device based, at least in part, on the map information and the additional measurement information.

In accordance with yet another example implementation, a mobile device may be provided which comprises: a network interface; and one or more processing units to: access map information associated with at least a portion of an indoor environment comprising a plurality of regions; obtain additional measurement information associated with at least the portion of the indoor environment via the network interface, the additional measurement information being established based, at least in part, on previously obtained estimated position measurement information associated with a plurality of mobile devices within the indoor environment; and determine whether access to at least one of the plurality of regions is either feasible or infeasible to a user associated with the mobile device based, at least in part, on the map information and the additional measurement information.

In accordance with still another example implementation, an article of manufacturing may be provided which comprises a computer readable medium having stored therein computer executable instructions executable by one or more processing units of a mobile device to: obtain map information associated with at least a portion of an indoor environment comprising a plurality of regions; obtain additional measurement information associated with at least the portion of the indoor environment, the additional measurement information being established based, at least in part, on previously obtained estimated position measurement information associated with a plurality of mobile devices within the indoor environment; and determine whether access to at least one of the plurality of regions is either feasible or infeasible to a user associated with the mobile device based, at least in part, on the map information and the additional measurement information.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various method and apparatuses in a mobile device to possibly provide for or otherwise support a more reliable, accurate, useful, and/or otherwise more robust positioning and/or navigation capability in a mobile device.

For example, in certain implementations, a mobile device may obtain map information associated with at least a portion of an indoor environment comprising a plurality of regions. The mobile device may also obtain additional measurement information associated with at least the portion of the indoor environment, wherein the additional measurement information is based, at least in part, on previously obtained estimated position measurement information associated with a plurality of mobile devices within the indoor environment. The mobile device may then determine whether access to at least one of the plurality of regions is either feasible or infeasible to a user associated with the mobile device. The determination may be based, at least in part, on the map information and the additional measurement information.

In certain other example implementations, certain types of user information may also be obtained and considered in determining whether access to a region is either feasible or infeasible to a user associated with the mobile device. For example, user information may identify certain user preferences, access privileges, and/or the like with regard to physical features and/or logical metrics that may be associated with a region.

Having determined which regions may be accessed (feasible) and which regions may not be accessed (infeasible), a mobile device may, for example, affect or possibly enhance one or more positioning and/or navigation capabilities accordingly. For example, a route to be navigated may be selected which avoids regions determined to have infeasible access for the user of the device. Moreover, in certain example implementations, estimated position measurement information may be corrected or other affected if a current position estimate appears to place a mobile device in a region determined to have infeasible access for the user. Further still, in certain example implementations, a user or others may be alerted in some manner if a current estimated position of mobile device appears to place a mobile device in a region determined to have infeasible access for the user.

Figure 1A:
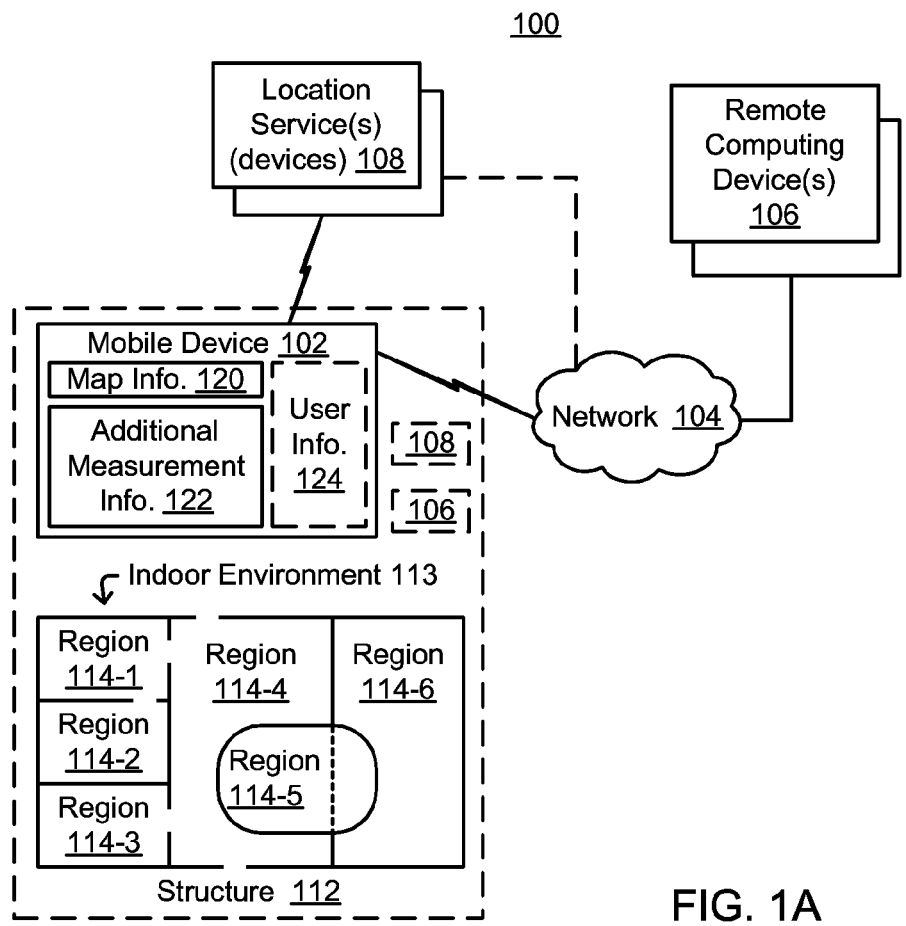
FIG. 1A is a schematic block diagram illustrating an exemplary environment that includes a mobile device to determine whether access to a region is feasible or infeasible for a user of the mobile device, in accordance with an implementation.

Attention is drawn now to FIG. 1A, which is a schematic block diagram illustrating an example environment 100 comprising a mobile device 102, a network 104, one or more remote computing device(s) 106, and one or more location service(s) (devices) 108. FIG. 1A and similarly 1B also include an example layout for a portion of a floor plan for a part of a structure 112 defining an example indoor environment.

Mobile device 102 is shown as being wirelessly connected to network 104. Network 104 may be further connected to one or more remote computing devices 106. Mobile device 102 may also be connected or otherwise arranged to use one or more location services (devices) 108. As further illustrated, in certain example implementations one or more computing devices 106 and/or location services (devices) 108 may be at least partially located within structure 112.

Mobile device 102 is representative of any electronic device that may be reasonably moved about by a user. By way of example but not limitation, mobile device 102 may comprise a computing and/or communication device such as a mobile telephone, smart phone, lap top computer, tablet computer, a personal computer, a wearable computer, a personal digital assistant, a navigation device, etc.

Mobile device 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Network 104 is representative of one or more wired and/or wireless communication networks and/or the like which enables communication between mobile device 102 and remote computing device(s) 106. By way of example, network 104 may include a telecommunications and/or data network and/or services, cellular and/or other wireless networks, an intranet, the Internet, etc. Thus, network 104 may comprise an access point, a base station, one or more computing and/or communication resources, etc. In certain instances, network 104 may comprise a "cloud" computing resource and/or the like.

Remote computing device(s) 106 may comprise, for example, one or more computing devices, communication devices/resources, data storage devices, etc.

Location service(s) 108 is representative of one or more wireless signal based location services and/or devices such as, a GNSS (e.g., GPS, etc.) or other like satellite and/or terrestrial locating service, a location based service (e.g., via a cellular network, a WiFi network, etc.). In certain example implementations, location based services or the like may be provided by and/or otherwise supported in some manner via other resources within network 104 and/or one or more remote computing devices 106.

Mobile device 102 may be enabled to assist its user to navigate all or portions of one or more structures 112. Mobile device may be enabled to obtain it estimated position measurement, for example, by trilateration, triangulation, and/or other ranging techniques associated with signals transmitted by location beacons, and/or other devices. Such techniques are well known.

Mobile device 102 may be further enabled to assist its user to navigate all or portions of one or more structures (e.g., indoor environments) by obtaining and considering applicable map information and additional measurement information. In certain example implementations, mobile device 102 may also consider applicable user information. Some example types and uses of such information by mobile device 102 will now be described. It should be kept in mind that all of the examples presented herein are non-limiting with regard to claimed subject matter.

As further illustrated in FIG. 1A, map information 120 may be obtained by mobile device 102. For example, map information 120 may represent electronic digital map information associated with at least a portion of an indoor environment 113 within structure 112 comprising a plurality of regions 114. By way of non-limiting example, map information 120 may comprise all or part of one or more computer-aided design (CAD) data exchange files relating to such an indoor environment.

Map information 120 may, for example, identify one or more physical features of an indoor environment, such as, e.g., walls, rooms, doors, passageways, elevators, staircases, ladders, floors, ceilings, and/or other structural features. Thus, in certain example implementations, one or more regions 114 may be defined or otherwise derived based, at least in part, on one or more physical features:

As described in greater detail below, the physical features of a region 114 may be considered in determining whether access to the region is feasible or (physically) infeasible to a user of mobile device 102. Here, it is noted, that map information 120 may show some physically infeasible regions, which may nonetheless actually be physically accessible by certain personnel (e.g., authorized maintenance or security personnel, etc.). In certain instances, for example, there may even be regions that are not physically or otherwise readily accessible by anyone.

In certain example implementations, map information 120 may comprise other types of information, such as metadata or the like which may be included in a CAD data exchange file and/or otherwise included in one or more other associated data files of the same or a different format. For example, map information 120 may further identify one or more intended uses for one or more regions 114 within structure 112. By way of a non-limiting example, map information 120 may identify that a particular region is associated with one or more particular objects, entities, persons, services, tasks/purposes, etc. In certain instances, map information 120 may identify that a particular region is accessible during one or more particular times and/or upon an occurrence of one or more events, and/or other like conditional aspects/metrics, etc. As such, an intended use of a region may be considered in determining whether access to the region is feasible or (logically) infeasible to a user of mobile device 102.

Similarly, in certain example implementations, map information 120 may further comprise access restriction information for one or more regions 114 within structure 112. By way of some non-limiting examples, map information 120 may specify that a region 114 is intended to be feasible or infeasible for access, and/or conditionally-feasible or conditionally-infeasible for access. For example, map information 120 may specify that access to a region 114 is feasible or infeasible for one or more specifically identified users or groups of users. For example, map information 120 may specify that access to a region 114 is feasible or infeasible depending on a condition being satisfied. Here, for example, a condition may be met based on satisfying one or more threshold values, passing one or more tests, and/or on an occurrence of one or more events. For example, as mentioned previously, in certain instances access to a region 114 may be identified as being feasible for a user of a mobile device 102 based on a time or date, or other like metric. Thus, access restriction information relating to a region 114 may be considered in determining whether access to the region is feasible or (logically) infeasible to a user of mobile device 102.

Thus, in accordance with certain further aspects, methods and/or apparatuses may be implemented to selectively and/or possibly dynamically identify applicable access restriction information and/or the like which may be associated with one or more regions. By way of further example, a computing device 106 or location service(s) device 108 may be enabled to allow an operator and/or possibly an automated process to selectively affect (e.g., input, change, etc.) such access restriction information and/or the like. Such access restriction information and/or the like may, for example, be provided as part of map information 120 to mobile device 102. Thus, map information 120 may selectively/dynamically identify that one or more regions may be (logically) infeasible for certain users and/or under certain conditions. Thus, for example, a museum curator or other personnel may selectively/dynamically affect such map information via one or more a computing devices to set visiting hours, show times, and/or other like access restriction information for one or more regions (e.g., displays, rooms, events, etc.) associated with a museum or show.

To support dynamically changing information, in certain example implementations all or part of map information 120 may be updated in accordance with some schedule, time frame, etc. Thus, for example, mobile device 102 may verify and/or update all or part of map information 120 using various techniques. For example, mobile device 102 may be enabled for data pulling and/or pushing communication techniques and/or other like data communication processes to obtain the latest version of map information 120 or applicable portion thereof. In certain example implementations, information may be exchanged between mobile device 102 and device(s) 106/108 to obtain map information 120 that may be particularly applicable to mobile device 102 and/or the user of mobile device 102. For example, a portion of additional measurement information 122 and/or user information 124 may be provided and/or otherwise processed and considered in some manner as part of a process to obtain all or part of map information 120.

Figure 1B:
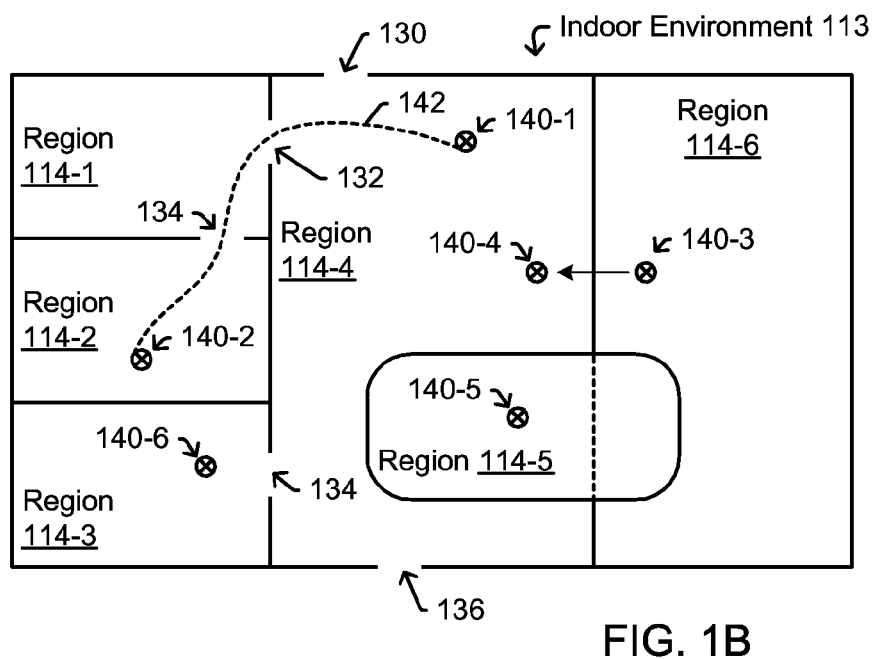
FIG. 1B is an example layout illustrating an exemplary indoor environment having certain regions that may be determined to be feasible or infeasible for a user of a mobile device, in accordance with an implementation.

In the example layout of regions 114 as shown in greater detail in FIG. 1B, it may be observed that access to regions 114-1, 114-2, 114-3, and 114-4 (as graphically shown) appears to be physically feasible as illustrated by applicable ingress features (openings) 130, 132, 134, and 136. To the contrary, access to regions 114-5 and 114-6 (as graphically shown) appears to be physically infeasible as illustrated by the lack of applicable ingress features. Hence, all or certain user(s) may be unable to be located at position 140-3 and/or position 140-5.

As mentioned previously, access to a region 114 may be physically feasible but logically infeasible. Thus, as described below, in the example layout in FIG. 1B access to region 114-3 may be infeasible for a user of mobile device 102 given certain conditions.

As illustrated in the example layout of regions 114 in FIG. 1B, there may be situations wherein one or more adjacent regions overlap, in whole or part. For example, region 114-5 partially overlaps regions 114-4 and 114-6. For example, region 114-5 may represent an overhead maintenance corridor or catwalk extending horizontally within a floor of a building, or possibly an atrium opening extending vertically through one or more floors of a building. In such instances, the applicable logical feasibility/infeasibility decision factors from the overlapping regions may be combined in some manner, and/or the logical feasibility/infeasibility decision factors for one of overlapping regions may be applied.

Mobile device 102 may also obtain additional measurement information 122 that may be based, at least in part, on previously obtained position measurement information gathered from or otherwise associated with a plurality of mobile devices within an indoor environment 113 of structure 112. For example, additional measurement information 122 may comprise statistical information based on the navigation and/or observed/measured movement of other mobile devices. Thus, additional measurement information may identify a probability of access to a region 114 at a later or other particular time.

Thus, if other mobile devices appear to have entered into, passed through, or exited from a particular region in the past or during a particular period of time, then a probability of access for a currently moving mobile device may be greater. Conversely, for example, if other mobile devices appear to have not entered into, passed through, or exited from a particular region in the past or during a particular period of time, then a probability of access for a currently moving mobile device may be relatively lower. Thus, by way of a non-limiting example, a probability of access may be based, at least in part, on a number of mobile devices (e.g., a frequency, etc.), previously reporting estimated position measurements within a particular region.

In FIG. 1B, some example estimated positions 140 are shown for a mobile device at different times. For example, mobile device 102 may have an estimated position 140-1 in region 114-4 at an initial time. By way of example, mobile device 102 may obtain estimated position measurement information on its own or with network-based assistance based, at least in part, on wireless signals received from transmitters of location service devices 108.

To support navigation and/or other positioning capabilities, mobile device 102 may, for example, need to provide a route 142 from position 140-1 in region 114-4 to a desired position 140-2 in region 114-2. As shown, example route 142 leads the user through region 114-1 through opening 132 and then into region 114-2 through opening 134. In determining the navigation information associated with route 142, mobile device 102 may determine whether access to regions 114-1 and 114-2 is either feasible or infeasible for its user based, at least in part, on electronic digital map information 120 and additional measurement information 122.

In this example, it is first assumed that (as graphically illustrated) there are physical features that may presumably allow the user to navigate through openings 132 and 134. Note that in other examples, an opening or other like physical feature may actually inhibit certain users or groups of users from accessing a region. For example, a narrow opening or ladder may inhibit a wheelchair or other like device and/or otherwise prove to be inaccessible to certain users. Hence, in certain instances access to a region may be logically infeasible for a user when approached via one or more ingress features.

With access to regions 114-1 or 114-2 being determined to be both physical and logical feasibility based on map information 120, additional measurement information 122 may be considered to further determine whether such access is either feasible or infeasible to a user associated with the mobile device. Thus, additional measurement information 122 may identify that there may be some access problem which is not identified in map information 120. For example, additional measurement information 122 may specify a low probability of access to region 114-1 based on a lack of or reduced number of mobile devices being located within region 114-1, e.g., during a recent period of time. For example, temporary maintenance repairs may be occurring which reduce or prohibit access to region 114-1 for certain users. Hence, in such an example situation, route 142 may not be an adequate selection for the user and another route (not shown) may be selected instead.

In certain instances, route 142 may be presented to the user along with or following a warning, e.g., as part of an alert event. For example, if there are no other routes and it appears that the access may be logically infeasible based, at least in part, on the additional measurement information 122.

In certain example implementations, routing decisions may use additional measurement information 122 to weight different routes and/or portions thereof. Here, for example, statistical information associated with one or more likely regions to be navigated may be taken into consideration (e.g., via factor/parameter weighting, etc.) to possibly select a route that may prove to be more feasible for the user. Indeed, in certain instances, a route may be selected based more on the additional measurement information 122 than on map information 120. For example, map information 120 may be out of date and as such may not comprise information identifying a new entryway into a region 114. However, additional measurement information 122 may convey that hundreds of mobile stations, for example, have nonetheless transited into and out of the region through the new entryway. Thus, a route may include the new entryway. In certain instances, an alert event may be provided. Additionally, user input may be requested to verify that such entryway does indeed exist, and such information may be shared with other computing devices and/or services, e.g., to possibly up date map information 120, or further enhance additional measurement information 122, etc.

FIG. 1B also illustrates that a region 114-3 may be physically accessible, e.g., via opening 134, by certain users in accordance with map information 120. For example, a user of a mobile device may be allowed to navigate to position 140-6. As mentioned, there may be conditional or other like logical aspects associated with region 114-3 that may be intended to limit access to certain user(s) or groups of users, and/or regulate access to region 114-3 based on time or some other metric. Thus, as mentioned, map information 120 may include metadata and/or other data files which specify in some manner the logical conditions relating to access of region 114-3. Here, for example, a person or entity responsible for structure 112 and/or some region or other like aspect thereof, may be provided with an ability to modify or otherwise affect map information 120. By way of example, a computing device may be used to generate and/or otherwise affect map information 120. Thereafter, for example, all or part of map information 120 may be provided to mobile device 102. For example, mobile device 102 may receive map information 120 via one or more network interfaces from one or more computing devices 106 and/or possibly locations service device(s) 108.

As illustrated herein, the positioning and/or navigation capabilities of mobile device 102 may be further enhanced by considering additional measurement information 122. By way of example, a computing device (e.g., a server) may be used to obtain (e.g., gather) estimated position measurement information and/or other like navigation information from a plurality of mobile devices over a period of time, and establish additional measurement information 122. Thus, in one sense additional measurement information 122 may correspond in some manner to the ability of users, during the period of time, to access certain regions and/or otherwise navigate there about. Additional measurement information 122 may, for example, be provided to mobile device 102 via one or more network interfaces from one or more computing devices 106 and/or possibly locations service device(s) 108.

As illustrated in the example shown in FIG. 1A, mobile device 102 may also obtain user information 124. User information 124 may, for example, identify in some manner a profile or other like access capability and/or other information that may be considered in determining whether access to a region is either feasible or infeasible to a user associated with mobile device 102 based, at least in part, on map information 120 and additional measurement information 122. Thus, for example, user information 124 may identify that a user belongs to one or more groups of users, or that a user has certain security or other like access capabilities. In certain example implementations, user information 124 may specify certain physical and/or other conditional access requirements or preferences associated with a user. Here, by way of some non-limiting examples, user information 124 may identify that: a user has a preference to avoid stairs or ladders; a user has guest or other like limited privileges; a user has complete access privileges (e.g., a manager, a fireman, etc.); a user may access a particular region during certain hours or for a certain period of time, etc.; a user is male or female; and/or the like or any combination thereof. In certain example implementations, user information 124 may comprise user feedback (e.g., verification of access, physical features, objects, etc.) regarding a region, indoor environment, business, location, time, etc.

All or part of user information 124 may, for example, be obtained from one or more computing devices 106 and/or location service devices 108, and/or via user input or other like information obtained by mobile device 102. Thus, for example, a person or entity associated with structure 112 or portion (e.g., region) thereof may provide or otherwise specify all or part of user information 124.

It should be recognized that in certain example implementations, there may be no user information to consider in determining whether access to a region is either feasible or infeasible to a user. Here, for example, it may be that all users are deemed to be the same and hence the access decision may be based on map information 120 and additional measurement information 122 without considering user information 124.

Attention is drawn once again to the example layout shown in FIG. 1B, and in particular region 114-6. Here, it is assumed that access to region 114-6 has been determined to be infeasible for the user of mobile device 102 due to either physical and/or logical constraints. If an estimated position measurement for mobile device 102 places mobile device 102 at position 140-3 within region 114-6 then there may be an error in the estimated position. Hence, in response to identifying that a current estimated position measurement associated with mobile device 102 places it within region 114-6 in which access has been determined to be infeasible, mobile device 102 may identify an adjacent region (e.g., neighboring, nearby, most likely based on trajectory and/or history, etc.), in which access has been determined to be feasible, and affect the current estimated position information to place mobile device 102 within the adjacent region. Here, for example, as illustrated, mobile device 102 may change the current estimated position information from position 140-3 in infeasible region 114-6 to position 140-4 in feasible region 114-4, e.g., as shown by the arrow from position 140-3 to position 140-4. In certain example implementations, a user may be prompted or otherwise allowed to verify the change and/or potential error.

Figure 2:
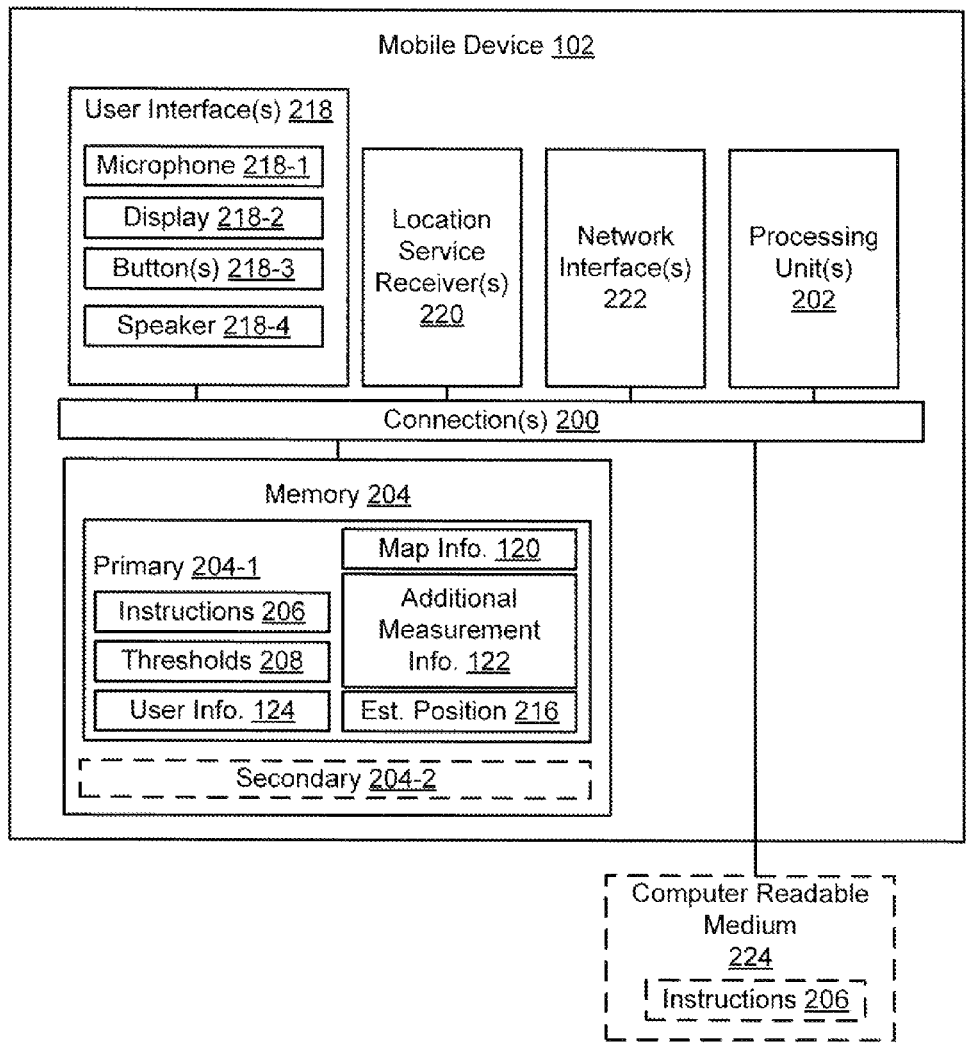
FIG. 2 is a schematic block diagram illustrating certain features of a mobile device, for example as in FIG. 1, capable of determining whether access to a region is feasible or infeasible for a user of the mobile device, in accordance with an implementation.

Reference is made next to FIG. 2, which is a schematic block diagram illustrating certain features of mobile device 102, for example as in FIG. 1A, in accordance with an implementation.

As illustrated mobile device 102 may comprise one or more processing units 202 to perform data processing (e.g., in accordance with all or part of the techniques provided herein) coupled to memory 204 via one or more connections 200. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 224. As illustrated, memory 204 and/or computer readable medium 224 may comprise instructions 206 associated with data processing (e.g., in accordance with the techniques provided herein).

As further illustrated, at certain times, memory 204 may comprise stored data representing map information 120 and additional measurement information 122. In certain example implementations, at times, memory 204 may comprise stored data representing user information 124. In certain example implementations, at times, memory 204 may comprise stored data 216 which may represent previous and/or current estimated position measurement information and/or other like navigation information. In certain example implementations, at times, memory 204 may comprise stored data 208 representing threshold values and/or other like metrics associated with applicable logical conditions which may affect a determination regarding access to one or more regions for a user.

As further illustrated, in certain example implementations and at certain times, memory 204 may comprise instructions 206 relating to one or more processes relating to (e.g., providing and/or otherwise supporting) one or more positioning and/navigation processes, communication processes, and/or other like data processing capabilities. While instructions relating to such processes may be illustrated in FIG. 2 as being at least partially stored in memory 204, it should be understood that such processes may be operatively provided in whole or part in one or more of processing unit(s) 202 and/or other like circuitry. For example, location service receiver(s) 220 and/or user interface(s) 218 may provide and/or otherwise support one or more positioning and/navigation processes. For example, network interfaces 222 and/or user interface(s) 218 may provide and/or otherwise support one or more communication processes Hence, Mobile device 102 may, for example, further comprise one or more user interfaces 218, which may be coupled to one or more of connections 200. By way of example, user interfaces 218 may comprise microphone 218-1, a display 218-2, one or more buttons/etc. 218-3, and/or a speaker 218-4, and/or other like user input/output mechanisms. One or more user interfaces 218 may be employed, for example, to obtain user inputs, display information to the user, provide feedback to the user, etc. In certain example implementations, a local alert may be presented to a user via one or more applicable output devices (e.g., display 218-2, speaker 218-4, and/or other like mechanisms (not shown) such as an LED or light, a buzzer or vibrator, etc.).

Mobile device 102 may, for example, as previously mentioned comprise one or more location service receivers 220 and/or network interfaces 222, which may be coupled to one or more of connections 200. All or part of the applicable data that may be used by the techniques presented herein, may be stored in memory 204, for example, following receipt of such data, information and/or instructions from other devices via one or more network interfaces 222.

Figure 3:
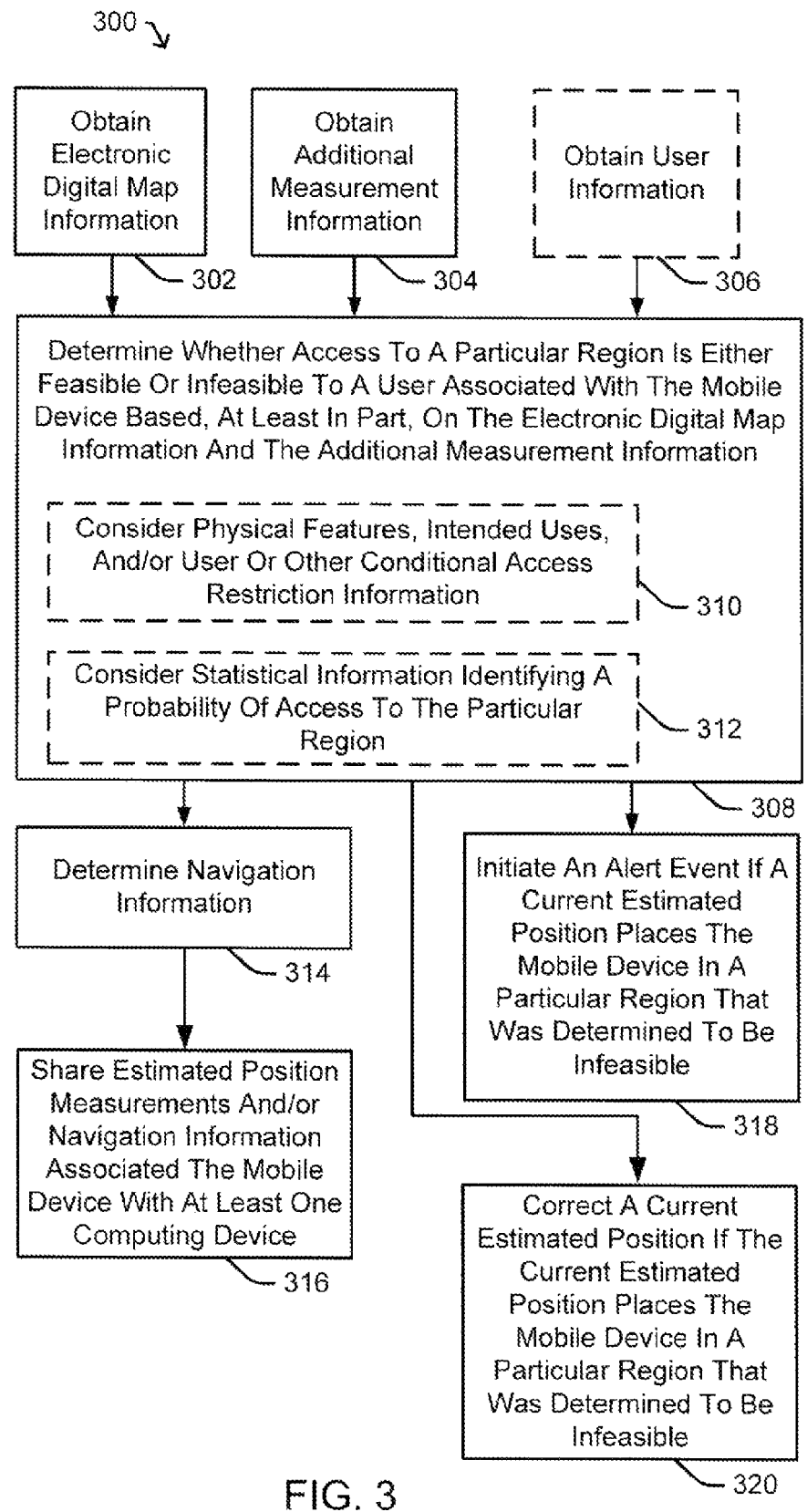
FIG. 3 is a flow diagram illustrating certain features of an exemplary process for use in a mobile device to determine whether access to a region is feasible or infeasible for a user of the mobile device, in accordance with an implementation.

Attention is drawn next to FIG. 3, which is flow diagram illustrating an example process 300 for use in a mobile device 102 to determine whether access to a region 114 is either more likely feasible or infeasible for a user of mobile device 102.

At block 302, map information 120 may be obtained. For example, map information 120 may comprise electronic digital map information and/or other like or related information (e.g., metadata, etc.) that is associated with at least a portion of an indoor environment (e.g., all or part of one or more structures), wherein the indoor environment comprises a plurality of regions. Thus, for example, map information 120 may comprise information relating to one or more regions. All or part of map information 120 may, for example, be pre-stored in memory of mobile device 102 and/or obtained from one or more networked and/or other like computing devices and/or services, e.g., via one or more network interfaces.

At block 304, additional measurement information 122 associated with the indoor environment may be obtained. For example, additional measurement information 122 may be based, at least in part, on previously obtained estimated position measurement information and/or other like navigation information associated with a plurality of mobile devices within the indoor environment. Thus, for example, additional measurement information 122 may comprise information relating to one or more regions. All or part of additional measurement information 122 may, for example, be pre-stored in memory of mobile device 102 and/or obtained from one or more networked and/or other like computing devices and/or services, e.g., via one or more network interfaces.

At block 306, in certain example implementations, user information 124 associated with the user of mobile device 102 (e.g., an intended user of mobile device 102) may be obtained. For example, user information 124 may be based, at least in part, on previously obtained user inputs and/or inputs from others regarding the user and/or profile information of the user, e.g., with respect to positioning and/or navigation preferences, etc., within certain indoor environments. Thus, for example, user information 124 may comprise information relating to one or more physical features and/or logical metrics, and/or other like profile information that may be useful in determining access capabilities for the user. All or part of user information 124 may, for example, be pre-stored in memory of mobile device 102, obtained from a user interface, and/or obtained from one or more networked and/or other like computing devices and/or services, e.g., via one or more network interfaces. Block 306 may be optional in certain example implementations.

At block 308, it may be determined whether access to a particular region is either feasible or infeasible to a user associated with the mobile device based, at least in part, on the map information 120 and the additional measurement information 122. For example, in certain implementations (at block 310) physical features, intended uses, and/or user or other conditional access restriction information associated with the particular region may be considered in making the decision at block 308. Such information may be provided, for example, in map information 120 and/or (optional) user information 124. In certain example implementations, e.g., at block 312, statistical and/or other like information identifying a probability of access to the particular region as provided in additional measurement information 122 may be considered in making the decision at block 308.

At block 314, position and/or other like navigation information for use by the user with regard to the particular region may be determined. For example, a route from a current estimated position to that of an item or point of interest may be determined through one more regions in which access for the user is determined to be feasible.

At block 316, position and/or other like navigation information relating to the mobile device may be shared (e.g., transmitted) with one or more computing devices. Here, for example, estimated position measurement information may be provided to one or more computing devices and/or services for consideration in establishing additional measurement information 122.

At block 318, in certain example implementations, one or more alert events may be initiated if a current estimated position places a mobile device in a particular region that has been determined to be infeasible to the user of the mobile device. Here, for example, alert data may be generated and stored, which identifies in some manner that a mobile device is or was estimated to be within a region in which access has been determined to be infeasible. In certain example implementations, a local alert may be presented to the user to convey that the mobile device may be or may have been within a region in which access has been determined to be infeasible. In certain example implementations, a remote alert may be transmitted to one or more computing devices to convey that the mobile device may be or may have been within a region in which access has been determined to be infeasible.

At block 320, in certain example implementations, a current estimated position measurement of a mobile device may be corrected or otherwise affected, if a current estimated position places the mobile device in a particular region that was determined to be infeasible. An example of such a technique was previously illustrated and described herein with regard to FIG. 1B and estimated position 140-3.

As shown in the above examples, the techniques presented herein may be implemented in various method and apparatuses in a mobile device 102 to allow the mobile device to obtain map information 120 associated with at least a portion of an indoor environment comprising a plurality of regions, and obtain additional measurement information associated with at least the portion of the indoor environment, wherein the additional measurement information 122 is based, at least in part, on previously obtained estimated position measurement information associated with a plurality of mobile devices within the indoor environment. Mobile device 102 may optionally obtain user information 124. Mobile device 102 may determine whether access to at least one of the plurality of regions is either feasible or infeasible to a user associated with the mobile device based, at least in part, on map information 120 and additional measurement information 122. Optionally, user information 124 may also be considered.

In certain example implementations, mobile device 102 may determine whether access to a region is either feasible or infeasible based, at least in part, on one or more physical features associated with the region as identified in map information 120.

In certain example implementations, mobile device 102 may determine whether access to a region is either feasible or infeasible based, at least in part, on one or more intended uses associated with the region as identified in map information 120. Here, for example, map information 120 may comprise access restriction information associated with at least one of the plurality of regions. In certain instances, such access restriction Information may identify whether access to a region is intended to be either feasible or infeasible to one or more users and/or one or more groups of users. In certain instances, such access restriction information may identify whether access to a region is intended to be either feasible or infeasible based on one or more threshold values.

In certain example implementations, at least a portion of additional measurement information 122 may comprise statistical information identifying a probability of access to a particular region. In certain instances, such statistical information may be determined based, at least in part, on a number (e.g., frequency) of mobile devices previously reporting estimated position measurements within a particular region.

In certain example implementations, mobile device 102 may, in response to determining that access to a region is feasible, further determine navigation information (e.g., a route 142) for use by the user in navigating into, out of, and/or through one or more regions. Conversely, mobile device 102 may, in response to determining that access to a region is infeasible, further determine navigation information (e.g., a route 142) for use by the user within the indoor environment without entering or passing through such an infeasible region.

In certain example implementations, mobile device 102 may identify an adjacent region in which access has been determined to be feasible and affect a current estimated position to place the mobile device within the adjacent region, in response to determining that the current estimated position measurement associated the mobile device places the mobile device within a region in which access has been determined to be infeasible.

In certain example implementations, mobile device 102 may initiate at least one alert event, e.g., in response to determining that a current estimated position measurement associated the mobile device places the mobile device within a region in which access has been determined to be infeasible.

Thus, as presented herein, in accordance with certain aspects, various techniques are provided which may be implemented using various methods and/or apparatuses to allow a mobile device to obtain map information associated with at least a portion of an indoor environment comprising a plurality of regions. The mobile device may also obtain additional measurement information associated with at least the portion of the indoor environment, wherein the additional measurement information is based, at least in part, on previously obtained estimated position measurement information that may be associated with one or more other mobile devices which were previously within the indoor environment. The mobile device may, for example, determine whether access to at least one of the plurality of regions is either feasible or infeasible to a user associated with the mobile device. Such example determination may be based, at least in part, on the map information and the additional measurement information.

By way of example, in one method, a mobile device may obtain one or more electrical signals representing map information associated with at least a portion of an indoor environment comprising a plurality of regions. The mobile device may also obtain one or more electrical signals representing additional measurement information associated with at least the portion of the indoor environment. Fore example, the additional measurement information may be based, at least in part, on previously obtained estimated position measurement information associated with a plurality of mobile devices within the indoor environment. The mobile device may determine whether access to at least one of the plurality of regions is either feasible or infeasible to a user associated with the mobile device based, at least in part, on the map information and the additional measurement information.

In certain example implementations, a mobile device may identify whether access to a region is either feasible or infeasible based, at least in part, on one or more physical features associated with the region as identified in the map information. In certain example implementations, a mobile device may identify whether access to a region is either feasible or infeasible based, at least in part, on one or more intended uses associated with the region as identified in the map information.

Map information may, for example comprise access restriction information which may be considered in determining whether access to a region is either feasible or infeasible. In one example method, all or part of the map information may be selectively and/or dynamically established or otherwise affected in some manner, for example using at least one computing device.

In certain example implementations, at least a portion of the additional measurement information may comprise statistical information identifying a probability of access to a region. For example, certain statistical information may be based, at least in part, on a number of mobile devices previously reporting estimated position measurements within a particular region. Accordingly, in certain example implementations, a mobile device may identify whether access to a region is either feasible or infeasible based, at least in part, on statistical information identifying a probability of access to a region.

In certain example implementations, the mobile device may determine navigation information for use by the user in navigating into, out of, and/or through the at least one of the plurality of regions based, at least in part, on determining that access to various regions is either feasible or infeasible.

In certain example implementations, a mobile device may correct or otherwise affect in some manner its estimated position, in response to identifying that a current estimated position measurement associated a mobile device places the mobile device within a region in which access has been determined to be infeasible. For example, a mobile device may identify an estimated position within an adjacent region in which access has been determined to be feasible and affect a current estimated position to identify (e.g., place) that the mobile device is estimated to be at a position within the adjacent region.

In certain example implementations, a mobile device may initiate at least one alert event in response to identifying that a current estimated position measurement associated the mobile device places the mobile device within a region in which access has been determined to be infeasible. For example, an alert event may comprise a local alert (e.g., for the user) and/or a remote alert (e.g., at another device).

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   with a mobile device:
   obtaining an electrical digital map corresponding to at least a portion of an indoor environment comprising a plurality of regions, wherein said electronic digital map is indicative of at least one physical feature within said indoor environment;
   obtaining an additional measurement corresponding to at least said portion of said indoor environment, said additional measurement being established based, at least in part, on previously obtained estimated position measurements for a plurality of mobile devices within said indoor environment; and
   determining whether physical access to at least one of said plurality of regions is either feasible or infeasible to a user associated with said mobile device based, at least in part, on said electronic digital map and said additional measurement.

2. The method as recited in claim 1, wherein determining whether said physical access to at least one of said plurality of regions is either feasible or infeasible to said user associated with said mobile device further comprises:
   identifying whether said physical access to said at least one of said plurality of regions is either feasible or infeasible based, at least in part, on a presence or an absence of said physical feature within said at least one of said plurality of regions.

3. The method as recited in claim 1, wherein determining whether said physical access to at least one of said plurality of regions is either feasible or infeasible to said user associated with said mobile device further comprises:
   identifying whether said physical access to said at least one of said plurality of regions is either feasible or infeasible based, at least in part, on one or more intended uses associated with said region as identified in said electronic digital map.

4. The method as recited in claim 1, wherein said electronic digital map further comprises access restriction information associated with at least one of said plurality of regions.

5. The method as recited in claim 4, and further comprising:
   determining whether said physical access to said at least one of said plurality of regions is either feasible or infeasible to said user associated with said mobile device based, at least in part, on said access restriction information.

6. The method as recited in claim 4, wherein said access restriction information identifies whether access to said at least one of said plurality of regions is intended to be either feasible or infeasible to one or more users and/or one or more groups of users.

7. The method as recited in claim 4, wherein said access restriction information identifies whether access to said at least one of said plurality of regions is intended to be either feasible or infeasible based on one or more threshold values.

8. The method as recited in claim 1, wherein said additional measurement comprises statistical information determined based, at least in part, on said estimated position, said statistical information identifying a probability of said physical access to a particular one of said plurality of regions.

9. The method as recited in claim 8, wherein at least a portion of said statistical information is determined based, at least in part, on a number of said plurality of mobile devices previously reporting said estimated position measurements corresponding to a particular one of said plurality of regions.

10. The method as recited in claim 1, wherein determining whether said physical access to at least one of said plurality of regions is either feasible or infeasible to said user associated with said mobile device further comprises:
    identifying whether said physical access to said at least one of said plurality of regions is either feasible or infeasible based, at least in part, on statistical information identifying a probability of access to said at least one of said plurality of regions.

11. The method as recited in claim 1, and further comprising:
    in response to determining that said physical access to said at least one of said plurality of regions is feasible to said user associated with said mobile device, determining navigation information for use by said user in navigating into, out of, and/or through said at least one of said plurality of regions.

12. The method as recited in claim 1, and further comprising:
    in response to determining that said physical access to said at least one of said plurality of regions is infeasible to said user associated with said mobile device, determining navigation information for use by said user in navigating within said indoor environment without entering or passing through said at least one of said plurality of regions.

13. The method as recited in claim 1, and further comprising:
    in response to identifying that a current estimated position measurement of said mobile device places said mobile device within at least one of said plurality of regions in which said physical access has been determined to be infeasible, identifying an adjacent one of said plurality of regions in which said physical access has been determined to be feasible, and affecting said current estimated position measurement to place said mobile device within said adjacent one of said plurality of regions.

14. The method as recited in claim 1, and further comprising:
    in response to identifying that a current estimated position measurement of said mobile device places said mobile device within at least one of said plurality of regions in which said physical access has been determined to be infeasible, initiating at least one alert event.

15. The method as recited in claim 14, wherein initiating said at least one alert event comprises at least one of:
    storing alert data identifying that said mobile device is or was estimated to be within at least one of said plurality of regions in which said physical access has been determined to be infeasible;
    presenting a local alert to said user that said mobile device, said local alert being based, at least in part, on said alert data; and/or
    transmitting one or more signals representing a remote alert based, at least in part, on said alert data, to at least one computing device.

16. The method as recited in claim 1, and further comprising:
    obtaining said estimated position measurements and/or navigation information corresponding to movements of said mobile device while within said indoor environment.

17. The method as recited in claim 16, and further comprising:
    transmitting, to at least one computing device, one or more signals representing at least a portion of said estimated position measurements and/or navigation information.

18. The method as recited in claim 1, wherein obtaining said electronic digital map comprises receiving at least a portion of said electronic digital map from at least one computing device.

19. The method as recited in claim 1, wherein obtaining said additional measurement information comprises receiving at least a portion of said additional measurement information from at least one computing device.

20. The method as recited in claim 1, wherein said electronic digital map comprises, at least in part, one or more computer-aided design (CAD) data exchange files.

21. The method as recited in claim 1, and further comprising:
    with said mobile device, selectively establishing at least a part of at least one of: said electronic digital map, and/or said additional measurement.

22. An apparatus for use in a mobile device, the apparatus comprising:
    means for obtaining an electronic digital map corresponding to at least a portion of an indoor environment comprising a plurality of regions, wherein said electronic digital map is indicative of at least one physical feature within said indoor environment;
    means for obtaining an additional measurement corresponding to at least said portion of said indoor environment, said additional measurement being established based, at least in part, on previously obtained estimated position measurements for a plurality of mobile devices within said indoor environment; and means for determining whether physical access to at least one of said plurality of regions is either feasible or infeasible to a user associated with said mobile device based, at least in part, on said electronic digital map and said additional measurement.

23. The apparatus as recited in claim 22, and further comprising:

means for determining whether access to said at least one of said plurality of regions is either feasible or infeasible based, at least in part, on a presence or an absence of said physical feature within said at least one of said plurality of regions.

24. The apparatus as recited in claim 22, and further comprising:

means for determining whether said physical access to said at least one of said plurality of regions is either feasible or infeasible based, at least in part, on one or more intended uses associated with said region as identified in said electronic digital map.

25. The apparatus as recited in claim 22, wherein said electronic digital map further comprises access restriction information associated with at least one of said plurality of regions.

26. The apparatus as recited in claim 25, and further comprising:

means for determining whether said physical access to said at least one of said plurality of regions is either feasible or infeasible to said user associated with said mobile device based, at least in part, on said access restriction information.

27. The apparatus as recited in claim 25, wherein said access restriction information identifies whether access to said at least one of said plurality of regions is intended to be either feasible or infeasible to one or more users and/or one or more groups of users.

28. The apparatus as recited in claim 25, wherein said access restriction information identifies whether access to said at least one of said plurality of regions is intended to be either feasible or infeasible based on one or more threshold values.

29. The apparatus as recited in claim 22, wherein said additional measurement comprises statistical information determined based, at least in part, on said estimated position information, said statistical information identifying a probability of said physical access to a particular one of said plurality of regions.

30. The apparatus as recited in claim 29, wherein the at least a portion of said statistical information is determined based, at least in part, on a number of said plurality of mobile devices previously reporting said estimated position measurements corresponding to a particular one of said plurality of regions.

31. The apparatus as recited in claim 22, and further comprising:

means for determining whether said physical access to said at least one of said plurality of regions is either feasible or infeasible based, at least in part, on statistical information identifying a probability of access to said at least one of said plurality of regions.

32. The apparatus as recited in claim 22, and further comprising:

means for determining navigation information for use by said user in navigating into, out of, and/or through said at least one of said plurality of regions, in response to determining that said physical access to said at least one of said plurality of regions is feasible to said user associated with said mobile device.

33. The apparatus as recited in claim 22, and further comprising:

means for determining navigation information for use by said user in navigating within said indoor environment without entering or passing through said at least one of said plurality of regions, in response to determining that said physical access to said at least one of said plurality of regions is infeasible to said user associated with said mobile device.

34. The apparatus as recited in claim 22, and further comprising:

means for identifying an adjacent one of said plurality of regions in which said physical access has been determined to be feasible, and affecting a current estimated position measurement of said mobile device to place said mobile device within said adjacent one of said plurality of regions, in response to determining that said current estimated position measurement places said mobile device within at least one of said plurality of regions in which said physical access has been determined to be infeasible.

35. The apparatus as recited in claim 22, and further comprising:

means for initiating at least one alert event, in response to determining that a current estimated position measurement of said mobile device places said mobile device within at least one of said plurality of regions in which said physical access has been determined to be infeasible.

36. The apparatus as recited in claim 35, wherein said means for initiating said at least one alert event comprises at least one of:

means for storing alert data identifying that said mobile device is or was estimated to be within at least one of said plurality of regions in which said physical access has been determined to be infeasible;

means for presenting a local alert to said user based, at least in part, on said alert data; and/or means for providing a remote alert based, at least in part, on said alert data, to at least one computing device.

37. The apparatus as recited in claim 22, and further comprising:

means for obtaining said estimated position measurements and/or navigation information corresponding to movements of said mobile device while within said indoor environment.

38. The apparatus as recited in claim 37, and further comprising:

means for transmitting, to at least one computing device, at least a portion of said estimated position measurements and/or navigation information.

39. The apparatus as recited in claim 22, wherein said means for obtaining said electronic digital map comprises:

means for receiving at least a portion of said electronic digital map from at least one computing device.

40. The apparatus as recited in claim 22, wherein said means for obtaining said additional measurement information comprises:

means for receiving at least a portion of said additional measurement information from at least one computing device.

41. The apparatus as recited in claim 22, wherein said electronic digital map comprises, at least in part, one or more computer-aided design (CAD) data exchange files.

42. A mobile device comprising:
a network interface; and
one or more processing units to:
   access an electronic digital map to at least a portion of an indoor environment comprising a plurality of regions, wherein said electronic digital map is indicative of at least one physical feature within said indoor environment;
   obtain an additional measurement corresponding to at least said portion of said indoor environment via said network interface, said additional measurement being established based, at least in part, on previously obtained estimated position measurements for a plurality of mobile devices within said indoor environment; and
   determine whether physical access to at least one of said plurality of regions is either feasible or infeasible-to a user associated with said mobile device based, at least in part, on said electronic digital map and said additional measurement.

43. The mobile device as recited in claim 42, wherein said one or more processing units further:
   determine whether said physical access to said at least one of said plurality of regions is either feasible or infeasible based, at least in part, on a presence or an absence of said physical feature within said at least one of said plurality of regions.

44. The mobile device as recited in claim 42, wherein said one or more processing units further:
   determine whether said physical access to said at least one of said plurality of regions is either feasible or infeasible based, at least in part, on one or more intended uses associated with said region as identified in said electronic digital map.

45. The mobile device as recited in claim 42, wherein said electronic digital map further comprises access restriction information associated with at least one of said plurality of regions.

46. The mobile device as recited in claim 45, wherein said one or more processing units further:
   determine whether said physical access to said at least one of said plurality of regions is either feasible or infeasible to said user associated with said mobile device based, at least in part, on said access restriction information.

47. The mobile device as recited in claim 45, wherein said access restriction information identifies whether access to said at least one of said plurality of regions is intended to be either feasible or infeasible to one or more users and/or one or more groups of users.

48. The mobile device as recited in claim 45, wherein said access restriction information identifies whether access to said at least one of said plurality of regions is intended to be either feasible or infeasible based on one or more threshold values.

49. The mobile device as recited in claim 42, wherein said additional measurement comprises statistical information determined based, at least in part, on said estimated position, said statistical information identifying a probability of said physical access to a particular one of said plurality of regions.

50. The mobile device as recited in claim 49, wherein the at least a portion of said statistical information is determined based, at least in part, on a number of said plurality of mobile devices previously reporting said estimated position measurements corresponding to a particular one of said plurality of regions.

51. The mobile device as recited in claim 42, wherein said one or more processing units further:
   determine whether said physical access to said at least one of said plurality of regions is either feasible or infeasible based, at least in part, on statistical information identifying a probability of access to said at least one of said plurality of regions.

52. The mobile device as recited in claim 42, wherein said one or more processing units further:
   determine navigation information for use by said user in navigating into, out of, and/or through said at least one of said plurality of regions, in response to determining that said physical access to said at least one of said plurality of regions is feasible to said user associated with said mobile device.

53. The mobile device as recited in claim 42, wherein said one or more processing units further:
   determine navigation information for use by said user in navigating within said indoor environment without entering or passing through said at least one of said plurality of regions, in response to determining that said physical access to said at least one of said plurality of regions is infeasible to said user associated with said mobile device.

54. The mobile device as recited in claim 42, wherein said one or more processing units further:
   identify an adjacent one of said plurality of regions in which said physical access has been determined to be feasible, and affecting a current estimated position measurement of said mobile device to place said mobile device within said adjacent one of said plurality of regions, in response to determining that said current estimated position measurement places said mobile device within at least one of said plurality of regions in which said physical access has been determined to be infeasible.

55. The mobile device as recited in claim 42, wherein said one or more processing units further:
   initiate at least one alert event, in response to determining that a current estimated position measurement of said mobile device places said mobile device within at least one of said plurality of regions in which said physical access has been determined to be infeasible.

56. The mobile device as recited in claim 55, wherein said at least one alert event results in at least one of:
   storage of alert data in a memory, said alert data identifying that said mobile device is or was estimated to be within at least one of said plurality of regions in which said physical access has been determined to be infeasible;
   use of at least one user interface to present a local alert to said user based, at least in part, on said alert data; and/or
   use of said network interface to transmit a remote alert based, at least in part, on said alert data, to at least one computing device.

57. The mobile device as recited in claim 42, wherein said one or more processing units further:
   obtain said estimated position measurements and/or navigation information corresponding to movements of said mobile device while within said indoor environment.

58. The mobile device as recited in claim 57, wherein said one or more processing units further:
   initiate transmission of at least a portion of said estimated position measurements and/or navigation information to at least one computing device via said network interface.

59. The mobile device as recited in claim 42, wherein at least a portion of said electronic digital map is received from at least one computing device via said network interface.

60. The mobile device as recited in claim 42, wherein the at least a portion of said additional measurement information is received from at least one computing device via said network interface.

61. The mobile device as recited in claim 42, wherein said electronic digital map comprises, at least in part, one or more computer-aided design (CAD) data exchange files.

62. An article comprising:
a non-transitory computer readable medium having stored therein computer executable instructions executable by one or more processing units of a mobile device to:
obtain an electronic digital map corresponding to at least a portion of an indoor environment comprising a plurality of regions, wherein said electronic digital map is indicative of at least one physical feature within said indoor environment;
obtain an additional measurement corresponding to at least said portion of said indoor environment, said additional measurement being established based, at least in part, on previously obtained estimated position measurements for a plurality of mobile devices within said indoor environment; and
determine whether physical access to at least one of said plurality of regions is either feasible or infeasible to a user associated with said mobile device based, at least in part, on said electronic digital map and said additional measurement.

63. The article as recited in claim 62, wherein said computer executable instructions being further executable by said one or more processing units to:
determine whether said physical access to said at least one of said plurality of regions is either feasible or infeasible based, at least in part, on a presence or an absence of said physical feature within said at least one of said plurality of regions.

64. The article as recited in claim 62, wherein said computer executable instructions are further executable by said one or more processing units to:
determine whether whether said physical access to said at least one of said plurality of regions is either feasible or infeasible based, at least in part, on one or more intended uses associated with said region as identified in said electronic digital map.

65. The article as recited in claim 62, wherein said electronic digital map further comprises access restriction information associated with at least one of said plurality of regions.

66. The article as recited in claim 65, wherein said computer executable instructions are further executable by said one or more processing units to:
determine whether said physical access to said at least one of said plurality of regions is either feasible or infeasible to said user associated with said mobile device based, at least in part, on said access restriction information.

67. The article as recited in claim 65, wherein said access restriction information identifies whether access to said at least one of said plurality of regions is intended to be either feasible or infeasible to one or more users and/or one or more groups of users.

68. The article as recited in claim 65, wherein said access restriction information identifies whether access to said at least one of said plurality of regions is intended to be either feasible or infeasible based on one or more threshold values.

69. The article as recited in claim 62, wherein said additional measurement comprises statistical information determined based, at least in part, on said estimated position, said statistical information identifying a probability of said physical access to a particular one of said plurality of regions.

70. The article as recited in claim 69, wherein at least a portion of said statistical information is determined based, at least in part, on a number of said plurality of mobile devices previously reporting said estimated position measurements corresponding to a particular one of said plurality of regions.

71. The article as recited in claim 62, wherein said computer executable instructions are further executable by said one or more processing units to:
determine whether said physical access to said at least one of said plurality of regions is either feasible or infeasible based, at least in part, on statistical information 5 identifying a probability of access to said at least one of said plurality of regions.

72. The article as recited in claim 62, wherein said computer executable instructions are further executable by said one or more processing units to:
determine navigation information for use by said user in navigating into, out of, and/or through said at least one of said plurality of regions, in response to determining that said physical access to said at least one of said plurality Of regions is feasible to said user associated with said mobile device.

73. The article as recited in claim 62, wherein said computer executable instructions are further executable by said one or more processing units to:
determine navigation information for use by said user in navigating within said indoor environment without entering or passing through said at least one of said plurality of regions, in response to determining that said physical access to said at least one of said plurality of regions is infeasible to said user associated with said mobile device.

74. The article as recited in claim 62, wherein said computer executable instructions are further executable by said one or more processing units to:
identify an adjacent one of said plurality of regions in which said physical access has been determined to be feasible, and affecting a current estimated position measurement of said mobile device to place said mobile device within said adjacent one of said plurality of regions, in response to determining that said current estimated position measurement places said mobile device within at least one of said plurality of regions in which said physical access has been determined to be infeasible.

75. The article as recited in claim 62, wherein said computer executable instructions are further executable by said one or more processing units to:
initiate at least one alert event, in response to determining that a current estimated position measurement of said mobile device places said mobile device within at least one of said plurality of regions in which said physical access has been determined to be infeasible.

76. The article as recited in claim 75, wherein said at least one alert event comprising at least one of:
storage of alert data identifying that said mobile device is or was estimated to be within at least one of said plurality of regions in which said physical access has been determined to be infeasible;
presentation of a local alert to said user based, at least in part, on said transmission of a remote alert based, at least in part, on said alert data, to at least one computing device.

77. The article as recited in claim 62, wherein said computer executable instructions are further executable by said one or more processing units to:
    obtain said estimated position measurements and/or navigation information corresponding to movements of said mobile device while within said indoor environment.

78. The article as recited in claim 77, wherein said computer executable instructions are further executable by said one or more processing units to:
    initiate transmission of at least a portion of said estimated position measurements and/or navigation information to at least one computing device.

79. The article as recited in claim 62, wherein said computer executable instructions are further executable by said one or more processing units to:
    initiate reception of at least a portion of said electronic digital map from at least one computing device.

80. The article as recited in claim 62, wherein said computer executable instructions are further executable by said one or more processing units to:
    initiate reception of at least a portion of said additional measurement information from at least one computing device.

81. The article as recited in claim 62, wherein said electronic digital map comprises, at least in part, one or more computer-aided design (CAD) data exchange files.

\* \* \* \* \*